(12) United States Patent
Takeuchi (10) Patent No.: US 12,019,933 B1
(45) Date of Patent: Jun. 25, 2024

(54) PRINTER SYSTEM, IMAGE FORMING APPARATUS, AND RECORDING MEDIUM STORING PRINTER SELECTION PROGRAM INCLUDING COMMUNICATION CIRCUIT

(71) Applicant: Toshiba Tec Kabushiki Kaisha, Tokyo (JP)

(72) Inventor: Kosuke Takeuchi, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/123,929

(22) Filed: Mar. 20, 2023

(51) Int. Cl.
*G06F 3/12* (2006.01)
*H04N 1/00* (2006.01)

(52) U.S. Cl.
CPC ............. *G06F 3/126* (2013.01); *G06F 3/12* (2013.01); *G06F 3/1204* (2013.01); *G06F 3/1224* (2013.01); *G06F 3/1236* (2013.01); *H04N 1/00278* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2013/0148159 A1* | 6/2013 | Takizawa | ............. | G06F 3/1296 358/1.15 |
| 2016/0112583 A1* | 4/2016 | Oguma | ................ | G06F 3/1267 358/1.15 |
| 2016/0255208 A1* | 9/2016 | Oguma | ................. | G06F 3/1211 358/1.15 |
| 2016/0274836 A1* | 9/2016 | Mimura | ............. | H04N 1/00204 |
| 2017/0123741 A1* | 5/2017 | Duran, Jr. | ............. | G06F 3/1232 |
| 2019/0095154 A1* | 3/2019 | Hayashi | ................ | G06F 3/1288 |
| 2020/0089454 A1* | 3/2020 | Inoda | ...................... | G06F 3/122 |
| 2022/0066709 A1* | 3/2022 | Hasegawa | ............ | G06F 3/1204 |

FOREIGN PATENT DOCUMENTS

JP 2013-135333 A 7/2013

* cited by examiner

*Primary Examiner* — Henok Shiferaw
(74) *Attorney, Agent, or Firm* — FOLEY & LARDNER LLP (57) ABSTRACT

A printer system includes an image forming apparatus and a plurality of printers capable of communicating with the image forming apparatus. The image forming apparatus includes a communication circuit that receives print information including print data from a data source, and transmits and receives information to and from the plurality of printers, and a controller that includes a hardware processor. Each of the plurality of printers includes a communication circuit that transmits and receives information to and from the image forming apparatus, a printing section that prints the print data received from the image forming apparatus on paper, and a controller that includes a hardware processor. The controller of the image forming apparatus acquires the print information through the communication circuit, and selects at least one suitable printer suitable for printing the print data, from among the plurality of printers, based on the print information.

12 Claims, 5 Drawing Sheets

PRINTER SYSTEM, IMAGE FORMING APPARATUS, AND RECORDING MEDIUM STORING PRINTER SELECTION PROGRAM INCLUDING COMMUNICATION CIRCUIT

FIELD

Embodiments described herein relate generally to a printer system, an image forming apparatus, and a recording medium storing a printer selection program.

BACKGROUND

A usage pattern in which a printer receives print data transmitted from a data source, and the printer prints the received print data on paper, is known. In this case, the data source is required to transmit print data suitable for the paper held by the printer. Alternatively, the printer is required to replace the paper with paper suitable for the print data.

DETAILED DESCRIPTION

In general, according to at least one embodiment, provided is a printer system including an image forming apparatus and a plurality of printers capable of communicating with the image forming apparatus. The image forming apparatus includes a communication circuit that receives print information including print data from a data source, and transmits and receives information to and from the plurality of printers, and a controller that includes a hardware processor. Each of the plurality of printers includes a communication circuit that transmits and receives information to and from the image forming apparatus, a printing section that prints the print data received from the image forming apparatus on paper, and a controller that includes a hardware processor. The controller of the image forming apparatus acquires the print information through the communication circuit, and selects at least one suitable printer suitable for printing the print data, from among the plurality of printers, based on the print information.

(Printer System)

Figure 1:
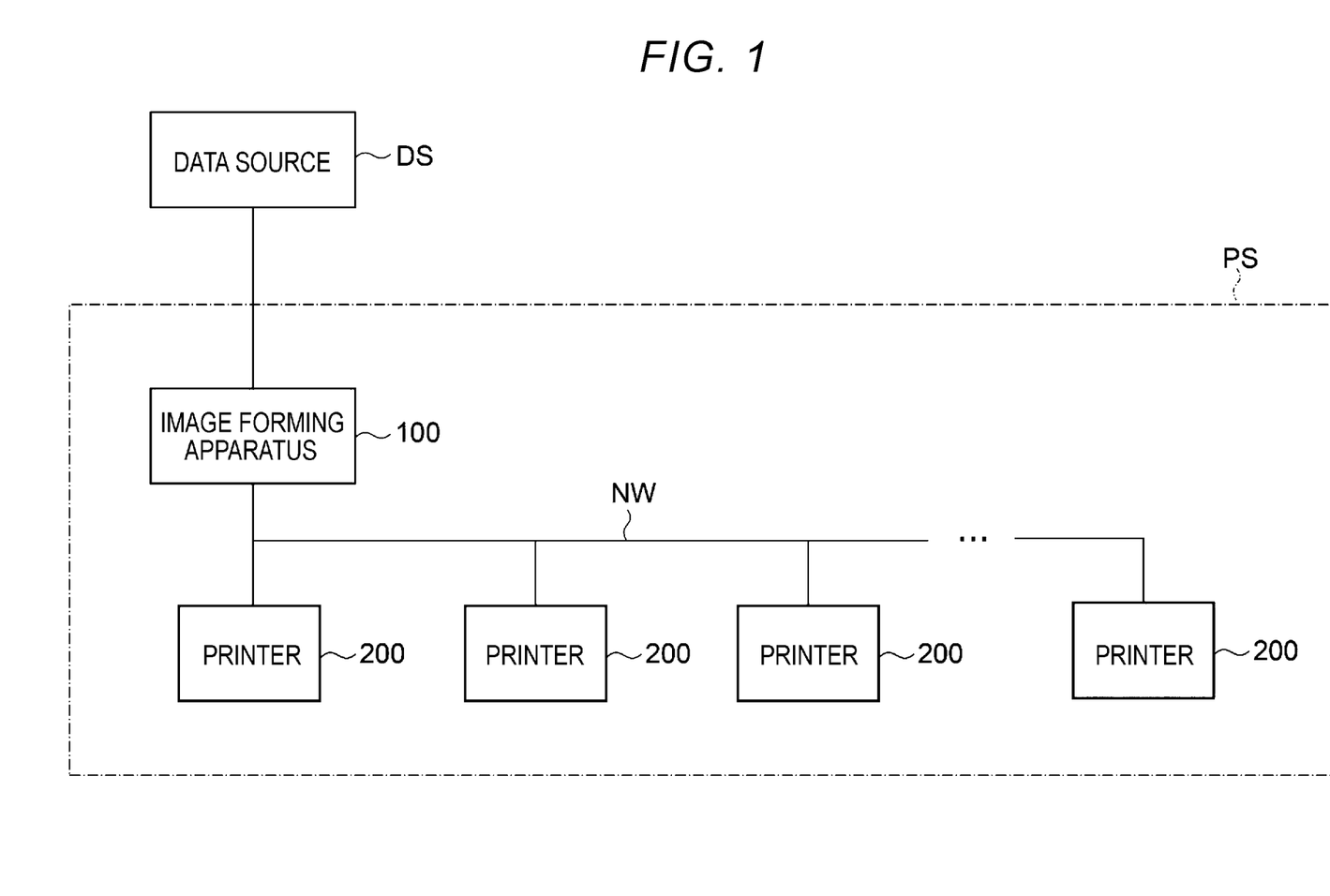
FIG. 1 is a block diagram showing a configuration of a printer system according to at least one embodiment.

First, a printer system PS according to at least one embodiment will be described with reference to FIG. 1. FIG. 1 is a block diagram showing the configuration of the printer system PS according to at least one embodiment.

The printer system PS has one image forming apparatus 100 and a plurality of printers 200 capable of communicating with the image forming apparatus 100.

The image forming apparatus 100 can transmit and receive information to and from a data source DS. The data source DS is, for example, a computer, a tablet, or the like. The data source DS is not limited to this, and may be any device that has a function of transmitting print information.

The transmission of print information from the data source DS to the image forming apparatus 100 may be performed wirelessly or by wire.

The information transmitted from the data source DS is print information including print data. The print information includes suitable paper information that is information on suitable paper suitable for printing the print data, in addition to the print data. The suitable paper information includes suitable paper width information that is information on a width of the suitable paper, suitable paper type information that is information on a type of the suitable paper, suitable printing temperature information that is information on a temperature suitable for printing, and the like.

The image forming apparatus 100 and the plurality of printers 200 can transmit and receive information via a network NW. The transmission and reception of the information between the image forming apparatus 100 and the plurality of printers 200 may be performed wirelessly or by wire. In other words, the network NW may be configured wirelessly or wired.

The printer system PS is a system in which the image forming apparatus 100 receives print information including print data from the data source DS, and transmits the print data to any one printer 200 of the plurality of printers 200, and the printer 200 that has received the print data prints the print data.

The plurality of printers 200 are installed in different locations, in other words, in different environments. The plurality of printers 200 may all be of the same model, or may include different models. Further, the plurality of printers 200 may all hold the same type of paper, or some or all of the printers may hold different types of paper. Differences in paper include the width of paper, the type of paper, the quality of paper, the unit price of paper, and the like. For example, the paper is a sticker. The sticker may be a sticker with mount or a sticker without mount. The paper is not limited to this, and may not be a sticker.

(Image Forming Apparatus)

Figure 2:
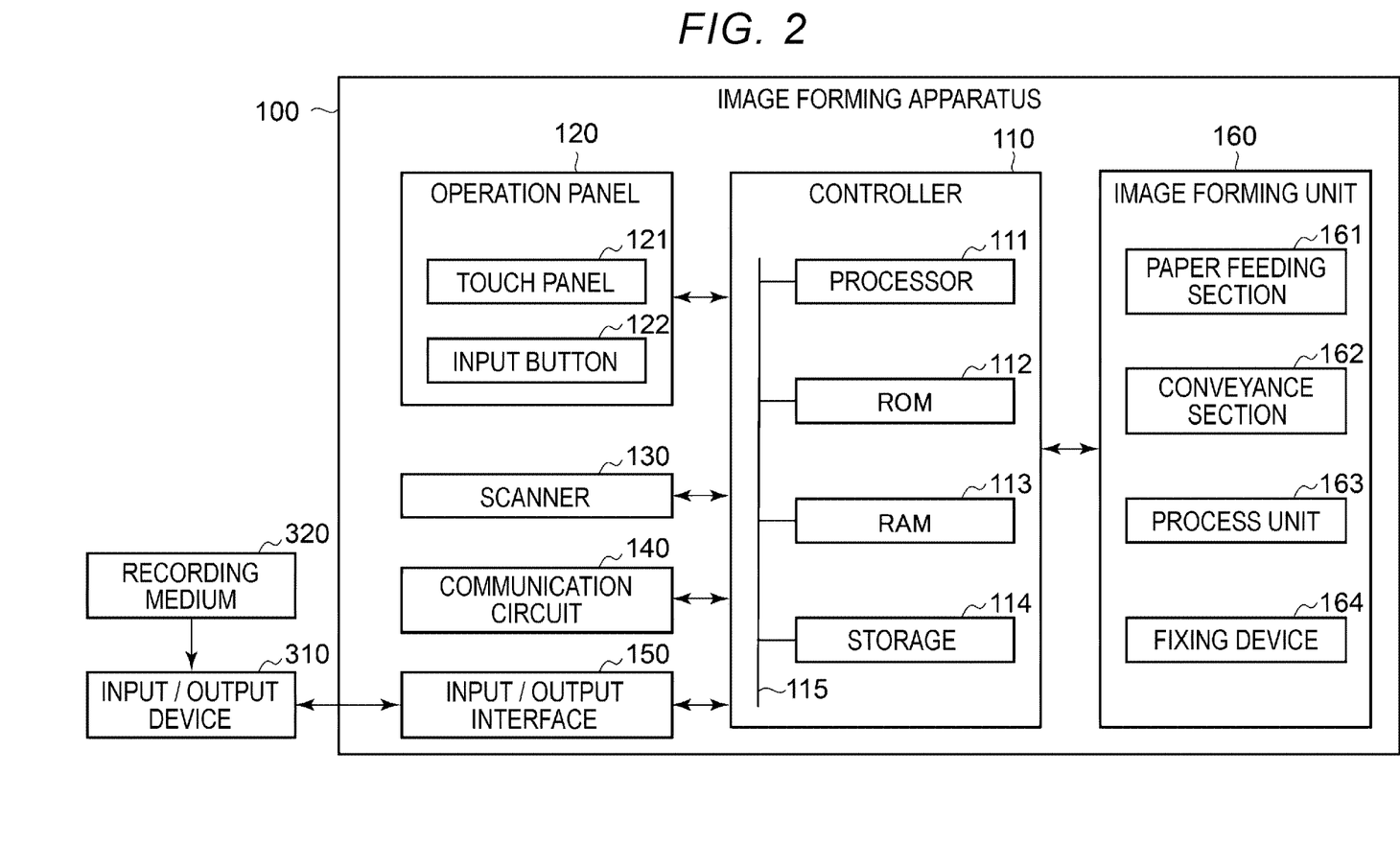
FIG. 2 is a block diagram showing a configuration of an image forming apparatus included in the printer system of FIG. 1.

Next, the image forming apparatus 100 included in the printer system PS of FIG. 1 will be described with reference to FIG. 2. FIG. 2 is a block diagram showing a configuration of the image forming apparatus 100. In FIG. 2, an input/output device 310 and a recording medium 320 are also drawn in addition to the image forming apparatus 100.

The image forming apparatus 100 is, for example, a multi-function peripheral (MFP). The image forming apparatus 100 has a plurality of functions such as a print function, a scan function, a copy function, and a facsimile function. The print function is a function of forming a toner image on paper. The scan function is a function of reading an image from a document. The copy function is a function of printing an image read from a document using the scan function, on paper using the print function. The facsimile function is a function of printing an image based on data received using a communication line, on paper using the print function. Further, the facsimile function is a function of transmitting using a communication line, an image read from a document using the scanning function.

The image forming apparatus 100 includes a controller 110, an operation panel 120, a scanner 130, a communication circuit 140, an input/output interface 150, and an image forming unit 160.

The controller 110 controls the operation of each unit of the image forming apparatus 100, for example, the operations of the operation panel 120, the scanner 130, the communication circuit 140, and the image forming unit 160. The controller 110 has a processor 111, a read only memory (ROM) 112, a random access memory (RAN) 113, and a storage 114. The processor 111, the ROM 112, the RAM 113 and the storage 114 are electrically connected to each other via a bus 115 and exchange data via the bus 115.

The processor 111 is composed of a general-purpose hardware processor including, for example, a central processing unit (CPU) or a graphical processing unit (GPU). The processor 111 controls the ROM 112, the RAM 113, and the storage 114 as a whole.

The ROM 112 is a non-volatile memory forming a part of the main memory. The ROM 112 non-temporarily stores a startup program required when starting up the image forming apparatus 100. The image forming apparatus 100 is started up by the processor 111 executing the program in the ROM 112. The ROM 112 is composed of, for example, an erasable programmable read only memory (EPROM), and stores various settings at startup in addition to the startup program.

The RAM 113 is a volatile memory forming a part of the main memory. The RAM 113 temporarily stores programs necessary for the processes of the processor 111 and data necessary for executing the programs. The processor 111 executes the program in the RAM 113 to operates the data in the RAM 113, and stores the operation result in the RAM 113.

The storage 114 is a non-volatile memory forming an auxiliary storage device. For example, the storage 114 is a hard disk drive (HDD), a solid state drive (SSD), or the like. The storage 114 non-temporarily stores programs executed by the processor 111 and data necessary for executing the programs. The programs and data stored in the storage 114 are the programs and data not contained in the ROM 112. The programs stored in the storage 114 are updatable. The processor 111 reads the program and data in the storage 114 into the RAM 113 and executes the program, thereby executing the control function of the controller 110, in other words, various functions of the image forming apparatus 100.

The operation panel 120 has a touch panel 121 and an input button 122 operated by the user of the image forming apparatus 100. The touch panel 121 is, for example, a laminate of a display such as a liquid crystal display or an organic EL display and a pointing device that receives input by a user's touch operation. The input button 122 is a device that receives input by a user's pressing operation. Therefore, the touch panel 121 and the input button 122 function as an input device that receives an operation by the user of the image forming apparatus 100. A display of the touch panel 121 functions as a display device that notifies the user of the image forming apparatus 100 of various types of information.

The scanner 130 is a device that reads images such as characters, graphics, and photographs drawn on a document. The scanner 130 has a document glass on which a document is placed, and an imaging element movable under the document glass. The imaging element reads an image of the document placed on the document glass through the document glass while being moved. The scanner 130 reads an image by an optical reduction method using, for example, a charge-coupled device (CCD) image sensor or the like as the imaging element. Alternatively, the scanner 130 reads an image by a contact image sensor (CIS) method using a complementary metal-oxide-semiconductor (CMOS) image sensor or the like as the imaging element. For example, images read by the scanner 130 are stored in the storage 114 under the control of the processor 111.

The communication circuit 140 is a device that enables controller 110 to communicate with the data source DS and the printer 200. The communication circuit 140 has a function of transmitting and receiving information to and from the data source DS. The communication circuit 140 also has a function of transmitting and receiving information to and from each printer 200. Further, the communication circuit 140 has a function of transmitting and receiving information to and from an external device. For example, the communication circuit 140 transmits an image stored in the storage 114 to an external device. Further, the communication circuit 140 receives images transmitted from the external devices, and the information received by the communication circuit 140 is stored in the storage 114 under the control of the processor 111.

The input/output interface 150 is a device for connecting the external device to the image forming apparatus 100. For example, the input/output interface 150 includes ports that enable connection with external devices. For example, the input/output device 310 is connected to the input/output interface 150. The input/output device 310 includes, for example, a semiconductor memory, a disk drive, and the like. The recording medium 320 non-temporarily records a program, which is non-temporarily stored in the storage 114 via the input/output device 310 and the input/output interface 150. The program non-temporarily stored in the storage 114 includes a printer selection program. The printer selection program is a program that causes the controller 110 to select a printer 200 suitable for printing the print data. Specifically, the printer selection program is a program that causes the processor 111 to execute at least a part of the functions of the controller 110.

The image forming unit 160 is a mechanism for printing images read by the scanner 130, images received by the communication circuit 140, and images stored in the storage 114 on paper.

There are a plurality of types of configurations of the image forming unit 160. Here, as an example, the image forming unit 160 using a tandem-type toner image transfer unit will be described. The image forming unit 160 has a paper feeding section 161, a conveyance section 162, a process unit 163 and a fixing device 164.

The paper feeding section 161 has a paper feed cassette and a pickup roller. The paper feed cassette accommodates a plurality of sheets of paper. The pickup roller picks up paper one by one from the paper feed cassette. The pickup roller supplies the picked-up paper to the conveyance section 162.

The conveyance section 162 conveys the paper supplied from the paper feeding section 161 through the process unit 163. The conveyance section 162 has a plurality of rollers and a registration roller. The plurality of rollers includes a roller that conveys paper supplied by the pickup roller to the registration roller. Further, the plurality of rollers is provided downstream of the fixing device 164, and includes a roller that discharges the paper to a discharge tray. The registration roller conveys the paper to a transfer unit in accordance with the timing when the transfer unit of the process unit 163 transfers the toner image to the paper.

The process unit 163 forms a toner image on the paper. The process unit 163 includes an intermediate transfer belt, a plurality of developing units, an exposure unit, the transfer unit, and the like. The intermediate transfer belt is an endless belt. The plurality of developing units correspond to the number of types of toners. The plurality of developing units include a black developing unit, a cyan developing unit, a magenta developing unit, and a yellow developing unit.

Each developing unit has a photoreceptor drum. Each developing unit has a charger, a developing device, a primary transfer roller, a cleaner, and a static eliminator around the photoreceptor drum. The photoreceptor drum is a drum having a photoreceptor layer on its surface. The charger uniformly charges the photoreceptor layer on the surface of the photoreceptor drum. The exposure unit irradiates the surface of the photoreceptor drum of each developing unit with a laser beam through an optical system including a polygon mirror or the like. The exposure unit forms an electrostatic pattern as an electrostatic latent image on the surface of the photoreceptor drum. The developing device develops the electrostatic latent image on the surface of the photoreceptor drum with toner. The developing device forms a toner image on the surface of the photoreceptor drum. The primary transfer roller faces the photoreceptor drum and sandwiches the intermediate transfer belt. The primary transfer roller transfers the toner image on the surface of the photoreceptor drum to the intermediate transfer belt. The cleaner removes untransferred toner on the surface of the photoreceptor drum. The static eliminator irradiates the surface of the photoreceptor drum with light. The static eliminator destaticizes the photoreceptor layer of the photoreceptor drum through light irradiation. The transfer unit transfers the charged toner image on the surface of the intermediate transfer belt to the paper. The transfer unit has a support roller and a secondary transfer roller configured to sandwich the intermediate transfer belt and the paper from both sides in the thickness direction.

The fixing device 164 applies heat and pressure to the paper on which the toner image is formed by passing through the process unit 163. The fixing device 164 fixes the toner image formed on the paper to the paper by heat and pressure.

(Printer)

Figure 3:
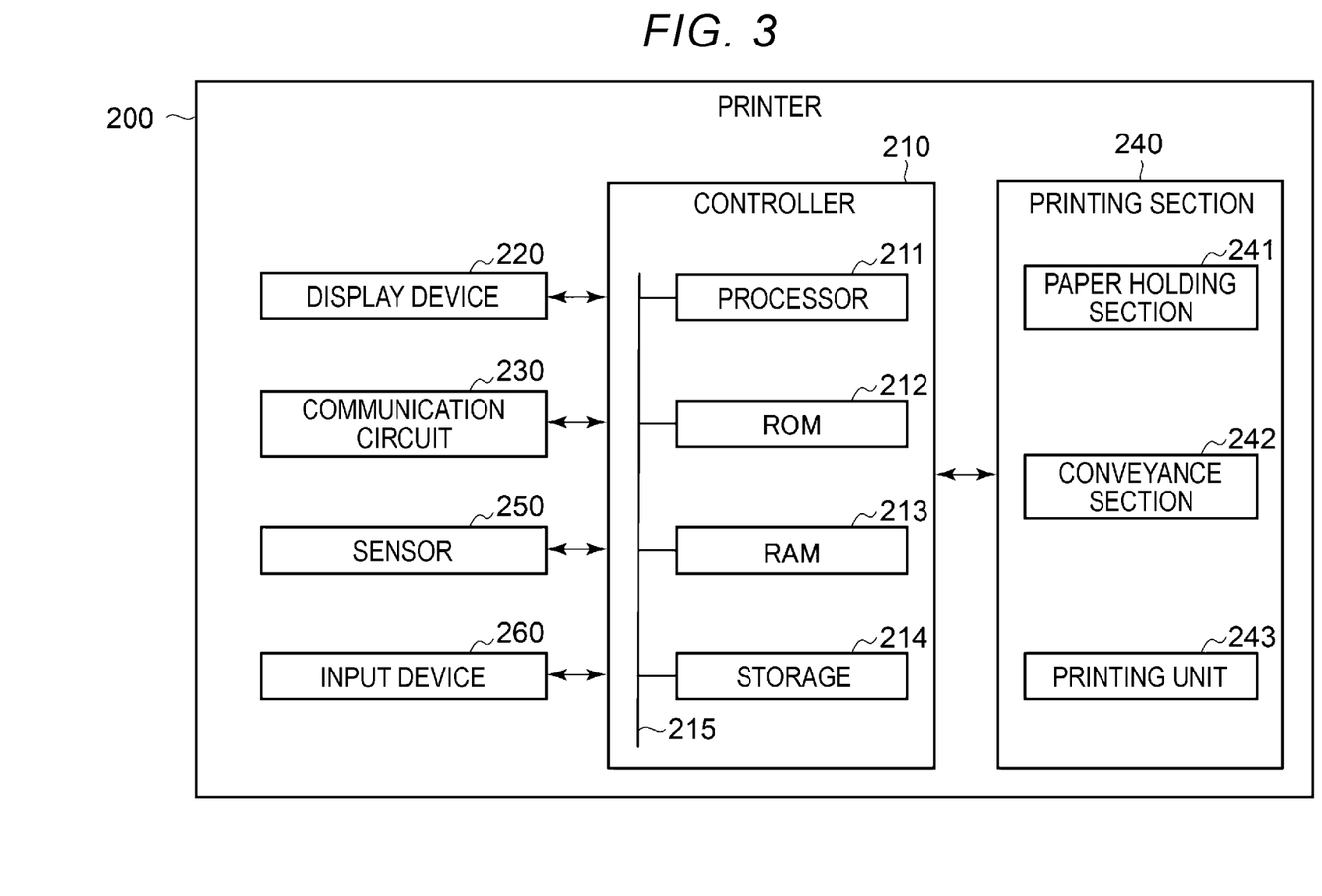
FIG. 3 is a block diagram showing a configuration of a printer included in the printer system of FIG. 1.

Subsequently, with reference to FIG. 3, the printer 200 included in the printer system PS of FIG. 1 will be described. FIG. 3 is a block diagram showing a configuration of one printer 200.

The printer 200 is, for example, a thermal printer. The printer 200 is not limited to this, and may be a dot printer or the like. Here, as an example, a configuration example in which the printer 200 is a thermal printer will be described.

The printer 200 includes a controller 210, a display device 220, a communication circuit 230, a printing section 240, a sensor 250, and an input device 260.

The controller 210 controls the operation of each unit of the printer 200, for example, the operations of the display device 220, the communication circuit 230, and the printing section 240. The controller 210 has a processor 211, a read only memory (ROM) 212, a random access memory (RAM) 213, and a storage 214. The processor 211, the ROM 212, the RAM 213, and the storage 214 are electrically connected to each other via a bus 215 and exchange data via the bus 215.

The configurations of the processor 211, ROM 212, RAM 213, and storage 214 of the controller 210 are the same as the configurations of the processor 111, ROM 112, RAM 113, and storage 114 of the controller 110, respectively. Therefore, the description of the processor 211, the ROM 212, the RAM 213, and the storage 214 is omitted here in order to avoid duplication of description.

The storage 214 stores device information regarding the printer 200. Examples of the device information include model information that is information on the model of the printer 200, installation location information that is information on the installation location of the printer 200, power consumption information that is information on the power consumption of the printer 200, temperature information that is information on the temperature of the printer 200, held paper information that is information on held paper held in the paper holding section 241, and the like. Examples of the held paper information include held paper width information that is information on the width of the held paper, held paper type information that is information on the type of the held paper, held paper quality information that is information on the quality of the held paper, unit price information that is information on the unit price of the held paper, or the like. The storage 214 also stores print data received from the image forming apparatus 100.

The display device 220 is a device capable of displaying images. The display device 220 is, for example, a liquid crystal display or an organic electroluminescence (EL) display. The display device 220 is not limited to these. The display device 220 functions to notify the user of the printer 200 of various types of information.

The communication circuit 230 is a device that enables communication with the image forming apparatus 100 via the network NW. The communication circuit 230 has a function of transmitting and receiving information to and from the image forming apparatus 100.

The printing section 240 is a device that prints an image on paper by generating heat. The printing section 240 has a paper holding section 241, a conveyance section 242, and a printing unit 243.

The paper holding section 241 is a device that holds paper. The paper may be sheet paper or roll paper. The paper holding section 241 has a function of supplying paper to the conveyance section 242.

The conveyance section 242 conveys the paper supplied from the paper holding section 241 through the printing unit 243. The conveyance section 242 has a plurality of rollers and a registration roller, similar to the conveyance section 162 of the image forming unit 160 of the image forming apparatus 100.

The printing unit 243 has a thermal head, a platen roller, and the like. The platen roller sandwiches the paper sent by the conveyance section 242 between the platen roller and the thermal head. The thermal head prints on paper by melting the ink contained in the ink ribbon with the heat generated by each heating element in the thermal head. The paper may be thermal paper. In this case, the printing unit 243 prints on paper by heat generated by each heating element of the thermal head without using an ink ribbon.

A sensor 250 detects device information on the printer 200. For example, the sensor 250 senses the temperature of the printer 200. The temperature of the printer 200 may be the temperature of a specific portion of the printer 200, such as the printing section 240, or the temperature of the installation location of the printer 200. Further, the sensor 250 may detect the width of the held paper held in the paper holding section 241. The information detected by the sensor 250 is stored in the storage 214 as the device information, under the control of the processor 211.

The input device 260 is a device that receives input information input by the user of the printer 200. For example, the input device 260 is a touch panel. In this case, the touch panel can also serve as the display device 220. The information input by the user includes information on the installation location of the printer 200, information on the installation environment, information on power consumption required for printing, type of paper, quality of paper, unit price of paper, and the like. Instead of the sensor 250 sensing the width of the paper, information on the width of the paper may be input by the user. The information input by the user is stored in the storage 214 as the device information, under the control of the processor 211.

First Operation Example

Figure 4:
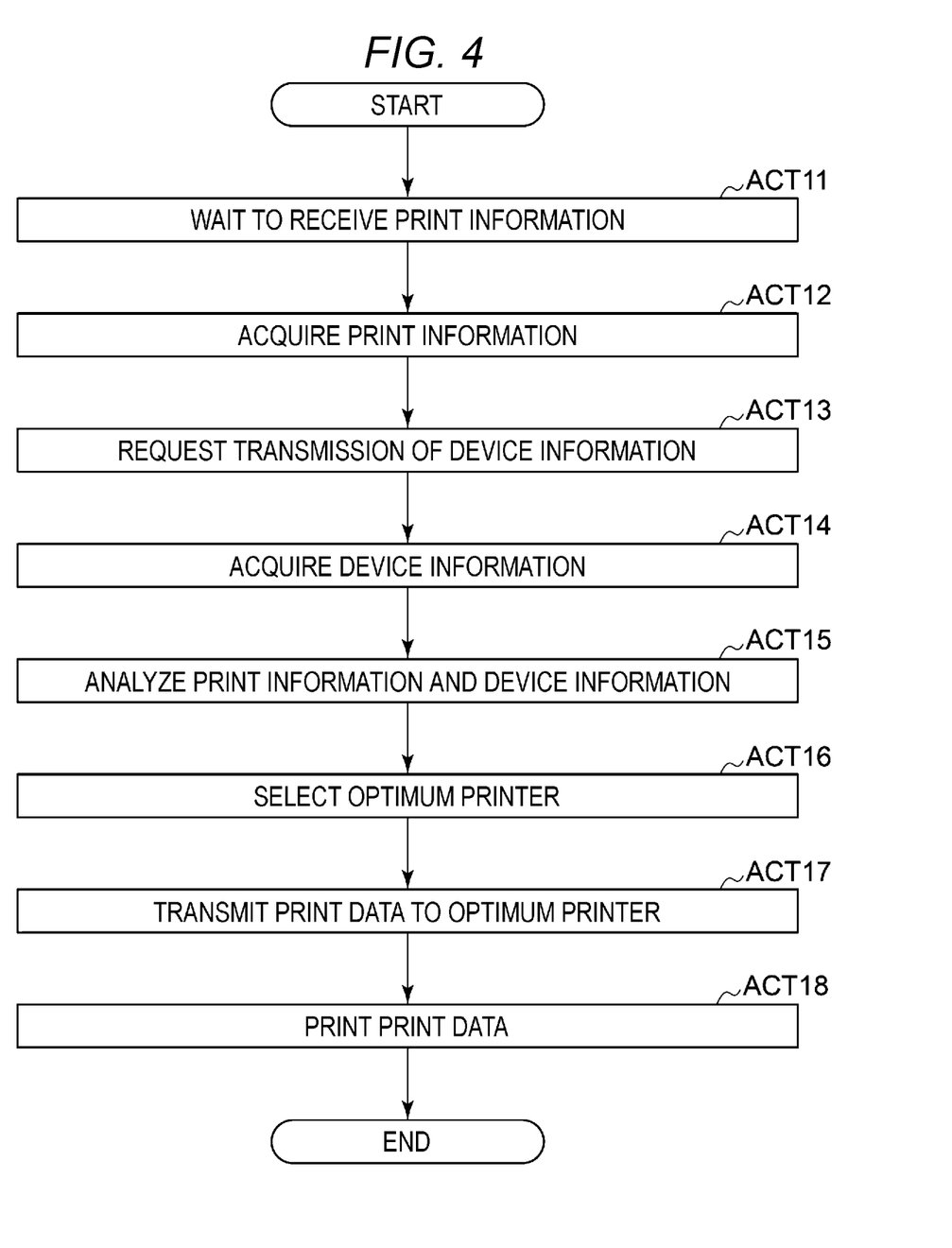
FIG. 4 is a flowchart showing a first operation example of the printer system of FIG. 1.

Hereinafter, a first operation example of the printer system PS according to at least one embodiment will be described with reference to FIG. 4. FIG. 4 is a flow chart showing a first operation example of the printer system PS.

In ACT 11, in the image forming apparatus 100, under the control of the controller 110, the communication circuit 140 waits to receive print information transmitted from the data source DS. In the printer 200, under the control of the controller 210, the communication circuit 230 waits to receive the print information transmitted from the image forming apparatus 100.

In ACT 12, upon receiving the print information, the communication circuit 140 of the image forming apparatus 100 transmits the print information to the controller 110. That is, the controller 110 acquires the print information via the communication circuit 140. The controller 110 causes the storage 114 to store the acquired print information.

The print information includes print data and suitable paper information that is information on suitable paper suitable for printing the print data. The suitable paper information includes suitable paper width information that is information on a width of the suitable paper, suitable paper type information that is information on a type of the suitable paper, suitable printing temperature information that is information on a temperature suitable for printing, and the like.

In ACT 13, in response to acquisition of the print information, the controller 110 causes the communication circuit 140 to transmit request information requesting transmission of device information on each printer 200, to each printer 200. Upon receiving the request information, the communication circuit 230 of each printer 200 transmits the request information to the controller 210. Upon receiving the request information, the controller 210 causes the communication circuit 230 to transmit the device information stored in the storage 214 to the image forming apparatus 100.

Examples of the device information on each printer 200 include model information that is information on the model of the printer 200, installation location information that is information on the installation location of the printer 200, power consumption information that is information on the power consumption of the printer 200, temperature information that is information on the temperature of the printer 200, held paper information that is information on held paper held in the paper holding section 241, and the like. Examples of the held paper information include held paper width information that is information on the width of the held paper, held paper type information that is information on the type of the held paper, held paper quality information that is information on the quality of the held paper, unit price information that is information on the unit price of the held paper, or the like.

In ACT 14, upon receiving the device information on each printer 200, the communication circuit 140 of the image forming apparatus 100 sends the device information on each printer 200, to the controller 110. That is, the controller 110 acquires the device information on each printer 200 via the communication circuit 140. The controller 110 causes the storage 114 to store the acquired device information on each printer 200.

The model information, installation location information, and power consumption information, which are the device information on each printer 200, may be stored in the storage 114 of the image forming apparatus 100 if each printer 200 is installed, without being included in the request information.

In ACT 15, the controller 110 reads the print information and the device information on each printer 200 from the storage 114 into the RAM 113, and analyzes the print information and the device information, and in ACT 16, the controller 110 selects an optimum printer most suitable for printing the print data, based on the analysis result of ACT 15.

In selecting the optimum printer, for example, the controller 110 selects candidates for the optimum printer, based on the suitable paper information in the print information and the held paper information in the device information. If there is only one candidate for the optimum printer, that printer 200 is selected as the optimum printer. If there is no candidate for the optimum printer, the controller 110 causes the communication circuit 140 to transmit information requesting change of the print information to the data source DS.

If there are a plurality of candidates for the optimum printer, for example, the controller 110 selects the optimum printer by giving priority to the suitable paper information and the held paper information, and giving top priority to the suitable paper width information and the held paper width information. As a result, if there is only one candidate for the optimum printer, the candidate printer 200 is selected as the optimum printer.

If there are still a plurality of candidates for the optimum printer, for example, the controller 110 selects the optimum printer, in consideration of the suitable paper type information and the held paper type information, in addition to the suitable paper width information and the held paper width information.

If there are a plurality of candidates for the optimum printer even after the above process, for example, the controller 110 selects the optimum printer, in consideration of model information, installation location information, power consumption information, temperature information, held paper quality information, held paper unit price information, and the like, in addition to the suitable paper width information, the held paper width information, the suitable paper type information, and the held paper type information.

In ACT 17, the controller 110 causes the communication circuit 140 to transmit print data to the optimum printer selected through the above process.

In ACT 18, the optimum printer receives the print data from the communication circuit 140 and performs a print process according to the print data.

Second Operation Example

Figure 5:
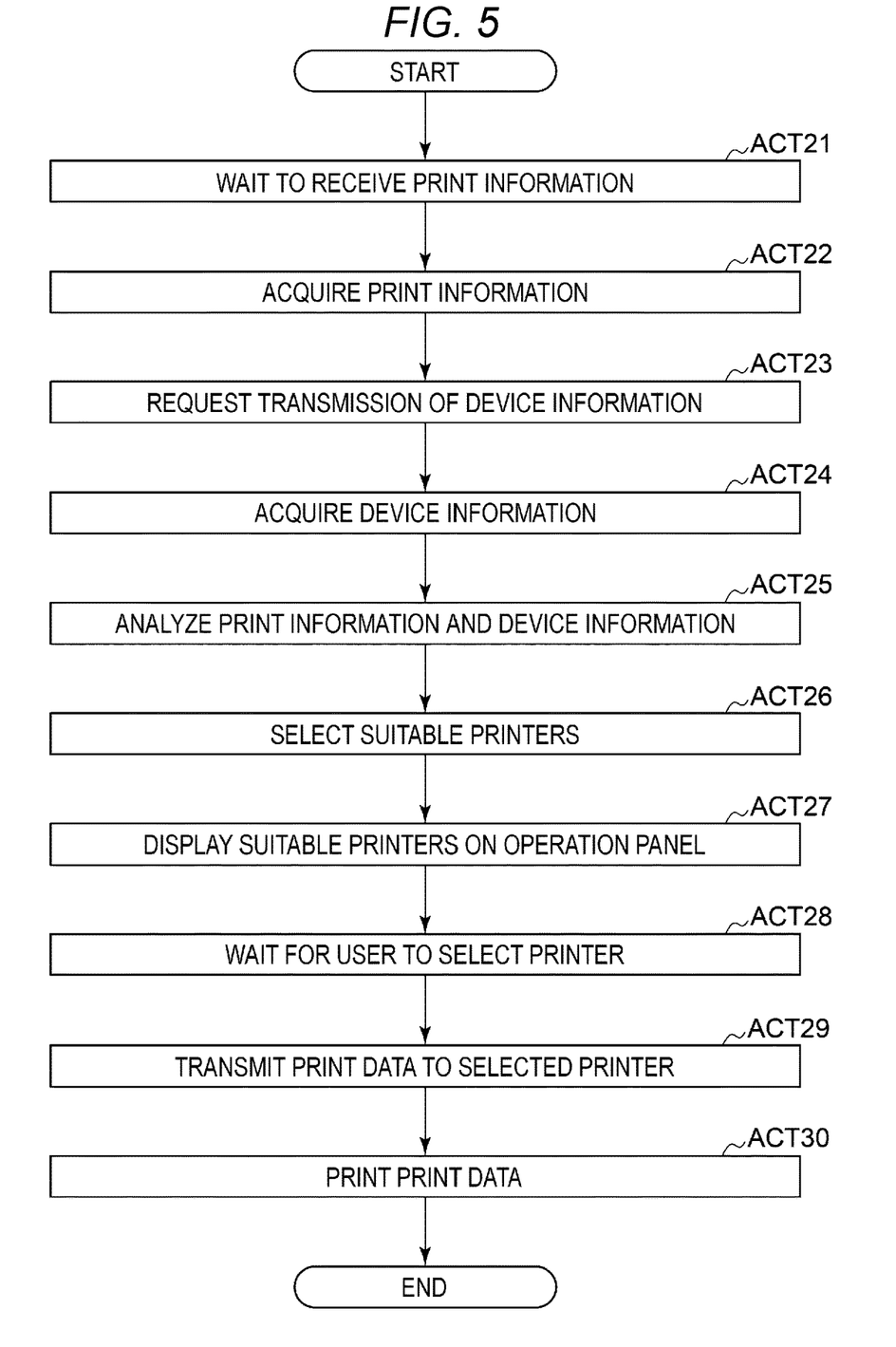
FIG. 5 is a flow chart showing a second operation example of the printer system of FIG. 1.

Next, a second operation example of the printer system PS according to the embodiment will be described with reference to FIG. 5. FIG. 5 is a flow chart showing the second operation example of the printer system PS.

The processes of ACT 21 to ACT 24 are the same as the processes of ACT 11 to ACT 14, respectively. Therefore, the description of the processes of ACT 21 to ACT 24 will be omitted here by referring to ACT 11 to ACT 14, respectively.

In ACT 25, the controller 110 reads the print information and the device information on each printer 200 from the storage 114 into the RAM 113, and analyzes the print information and the device information, and in ACT 26, the controller 110 selects suitable printers for printing the print data, based on the analysis result of ACT 25.

For example, the controller 110 selects suitable printers, based on the suitable paper information in the print information and the held paper information in the device information. If there is no suitable printer, the controller 110 causes the communication circuit 140 to transmit information requesting change of the print information to the data source DS.

If there are too many candidates for the suitable printer, for example, the controller 110 may reduce the number of candidates for the suitable printer using information other than the suitable paper information and the held paper information.

In ACT 27, the controller 110 displays suitable printers on the operation panel 120.

In ACT 28, the controller 110 waits for the user to select a printer. That is, the controller 110 waits for the user to select a printer from among the suitable printers displayed on the operation panel 120. The controller 110 continues waiting for the user to select a printer until the user selects a printer.

If the user selects a printer, in ACT 29, the controller 110 causes the communication circuit 140 to transmit print data to the printer selected by the user.

In ACT 30, the printer selected by the user receives the print data from the communication circuit 140 and performs a print process according to the print data.

EFFECT

In the printer system according to at least one embodiment, the image forming apparatus 100 receives print information including print data from the data source DS, and based on the print information, selects a printer suitable for printing the print data, from among the plurality of printers 200 capable of communicating with the image forming apparatus 100. Therefore, the process required on the data source DS side and the work required on the printer side are reduced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer system comprising:
an image forming apparatus; and
a plurality of printers configured to communicate with the image forming apparatus, wherein
the image forming apparatus includes:
a communication circuit configured to receive print information including print data from a data source, and to transmit and receive information to and from the plurality of printers, and
a controller including a hardware processor,
each of the plurality of printers includes:
a communication circuit configured to transmit and receive information to and from the image forming apparatus,
a printing section configured to print the print data received from the image forming apparatus on paper, and
a controller including a hardware processor, wherein
the controller of the image forming apparatus is configured to:
acquire the print information through the communication circuit, and
select at least one suitable printer suitable for printing the print data, from among the plurality of printers, based on the acquired print information,
the controller of the image forming apparatus is configured to cause the communication circuit of the image forming apparatus to transmit, to each printer of the plurality of printers, request information requesting transmission of device information on each printer,
the controller of each printer configured to cause the communication circuit of each printer to transmit the device information on each printer to the image forming apparatus, when receiving the request information via the communication circuit of each printer, wherein
the controller of the image forming apparatus is configured to:
acquire the device information on each printer via the communication circuit of the image forming apparatus, and
select the suitable printers by analyzing the print information and the acquired device information,
at least two of the plurality of printers hold different paper,
the print information includes suitable paper information that is information on suitable paper suitable for printing the print data,
the device information includes held paper information that is information on held paper held by each printer, and
the controller of the image forming apparatus is configured to select the suitable printers, based on the suitable paper information and the held paper information,
the suitable paper information includes suitable paper width information that is information on a width of the suitable paper,
the held paper information includes held paper width information that is information on a width of the held paper, and
the controller of the image forming apparatus is configured to select the suitable printers, by giving top priority to the suitable paper width information and the held paper width information,
the suitable paper information further includes suitable paper type information that is information on a type of the suitable paper,
the held paper information further includes held paper type information that is information on a type of the held paper, and
the controller of the image forming apparatus is configured to select the suitable printers, based on the suitable paper type information and the held paper type information, in addition to the suitable paper width information and the held paper width information.

2. A recording medium storing a printer selection program causing the hardware processor of the controller of the image forming apparatus according to claim 1 to execute at least some functions of the controller of the image forming apparatus.

3. The system according to claim 1, wherein the plurality of printers include different models of printers.

4. A printer system comprising:
an image forming apparatus; and
a plurality of printers configured to communicate with the image forming apparatus, wherein
the image forming apparatus includes:
a communication circuit configured to receive print information including print data from a data source, and to transmit and receive information to and from the plurality of printers, and
a controller including a hardware processor,
each of the plurality of printers includes:
a communication circuit configured to transmit and receive information to and from the image forming apparatus,
a printing section configured to print the print data received from the image forming apparatus on paper, and
a controller including a hardware processor, wherein
the controller of the image forming apparatus is configured to:
acquire the print information through the communication circuit, and
select at least one suitable printer suitable for printing the print data, from among the plurality of printers, based on the acquired print information,
the controller of the image forming apparatus is configured to cause the communication circuit of the image forming apparatus to transmit, to each printer of the plurality of printers, request information requesting transmission of device information on each printer,
the device information includes held paper information that is information on held paper held by each printer,
the suitable paper information further includes suitable paper type information that is information on a type of the suitable paper,
the controller of the image forming apparatus is configured to select the suitable printers, based on the suitable paper type information and the held paper type information, in addition to the suitable paper width information and the held paper width information,
the device information further includes model information that is information on a model of the printer, location information that is information on an installation location of the printer and temperature information that is information on a temperature of the printer, and
the held paper information further includes held paper quality information that is information on quality of the held paper and held paper unit price information that is information on a unit price of the held paper, and
the controller of the image forming apparatus is configured to select the suitable printers, based on the location information, the temperature information, the held paper quality information, and the held paper unit price information, in addition to the suitable paper width information, the held paper width information, the suitable paper type information, and the held paper type information.

5. The system according to claim 4, wherein
the controller of each printer configured to cause the communication circuit of each printer to transmit the device information on each printer to the image forming apparatus, when receiving the request information via the communication circuit of each printer, wherein
the controller of the image forming apparatus is configured to:
acquire the device information on each printer via the communication circuit of the image forming apparatus, and
select the suitable printers by analyzing the print information and the acquired device information.

6. The system according to claim 5, wherein
at least two of the plurality of printers hold different paper,
the print information includes suitable paper information that is information on suitable paper suitable for printing the print data,
and
the controller of the image forming apparatus is configured to select the suitable printers, based on the suitable paper information and the held paper information.

7. The system according to claim 6, wherein
the suitable paper information includes suitable paper width information that is information on a width of the suitable paper,
the held paper information includes held paper width information that is information on a width of the held paper, and
the controller of the image forming apparatus is configured to select the suitable printers, by giving top priority to the suitable paper width information and the held paper width information.

8. The system according to claim 7, wherein
the held paper information further includes held paper type information that is information on a type of the held paper.

9. The system according to claim 4, wherein
the controller of the image forming apparatus is configured to:
select one optimum printer most suitable for printing the print data, and
cause the communication circuit of the image forming apparatus to transmit the print data to the optimum printer.

10. The system according to claim 4, wherein
the image forming apparatus has an operation panel configured to display information and receive an operation from a user, and
the controller of the image forming apparatus is configured to:
cause the operation panel to display information on the suitable printers and allow the user to select any one of the suitable printers, and
cause the communication circuit of the image forming apparatus to transmit the print data to the printer selected by the user.

11. The system according to claim 4, wherein the image forming apparatus includes a multi-function peripheral.

12. A method comprising:
receiving print information including print data from a data source;
transmitting and receiving information to and from an image forming apparatus and a plurality of printers;
printing the print data received from the image forming apparatus on paper;
acquiring the print information;
selecting at least one suitable printer suitable for printing the print data, from among the plurality of printers, based on the acquired print information;
transmitting, to each printer of the plurality of printers, request information requesting transmission of device information on each printer;

transmitting the device information on each printer to the image forming apparatus, when receiving the request information;
acquiring the device information on each printer;
selecting the suitable printers by analyzing the print information and the acquired device information,
at least two of the plurality of printers hold different paper,
the print information includes suitable paper information that is information on suitable paper suitable for printing the print data,
the device information includes held paper information that is information on held paper held by each printer, and further comprising selecting the suitable printers, based on the suitable paper information and the held paper information,
at least two of the plurality of printers hold different paper,
the print information includes suitable paper information that is information on suitable paper suitable for printing the print data,
the device information includes held paper information that is information on held paper held by each printer, and further comprising selecting the suitable printers, based on the suitable paper information and the held paper information,
the suitable paper information includes suitable paper width information that is information on a width of the suitable paper,
the held paper information includes held paper width information that is information on a width of the held paper, and further comprising selecting the suitable printers, by giving top priority to the suitable paper width information and the held paper width information,
the device information further includes model information that is information on a model of the printer, location information that is information on an installation location of the printer and temperature information that is information on a temperature of the printer, and
the held paper information further includes held paper quality information that is information on quality of the held paper and held paper unit price information that is information on a unit price of the held paper, and
selecting the suitable printers, based on the location information, the temperature information, the held paper quality information, and the held paper unit price information, in addition to the suitable paper width information, the held paper width information, the suitable paper type information, and the held paper type information.

\* \* \* \* \*